United States Patent Office 3,185,236
Patented May 25, 1965

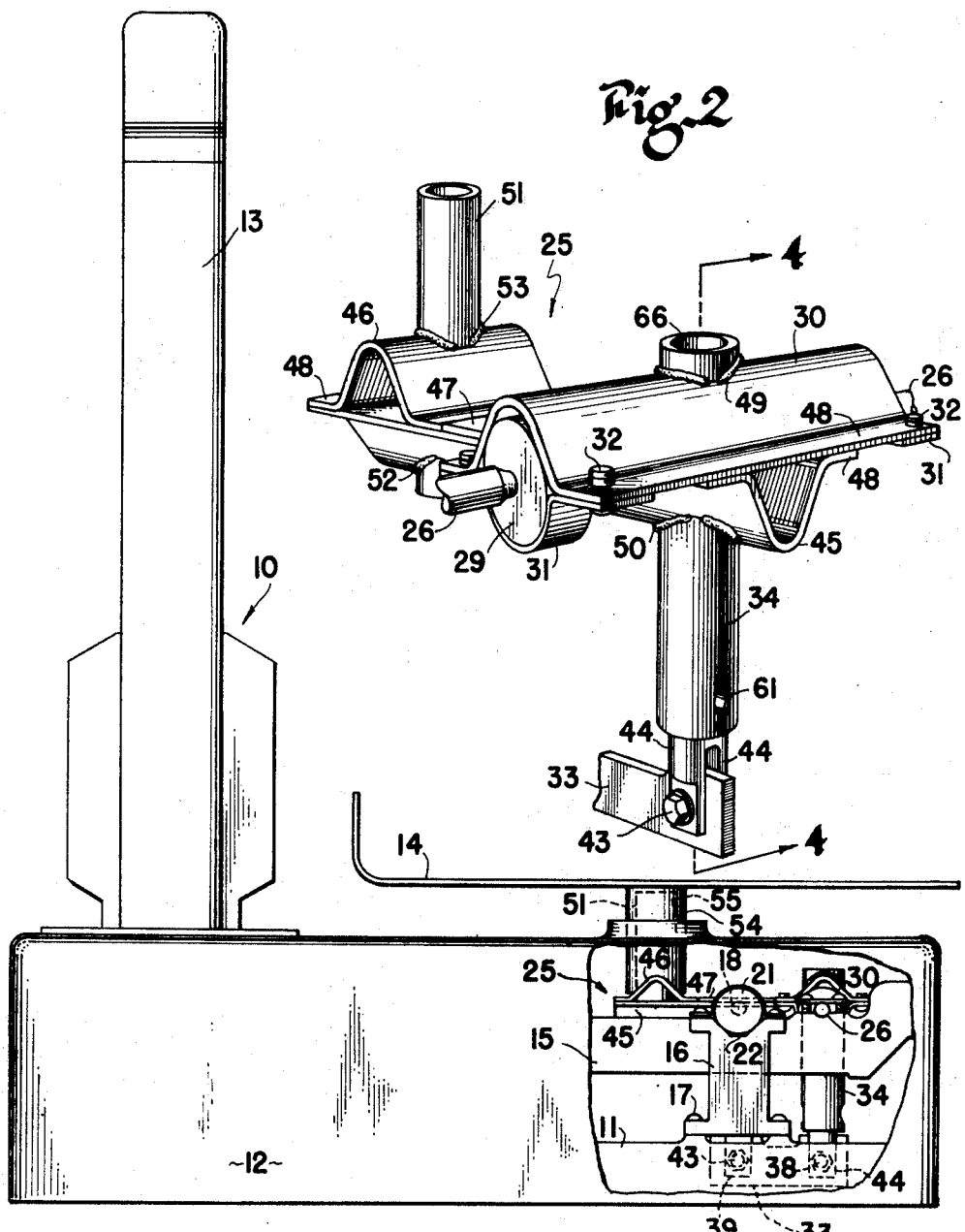

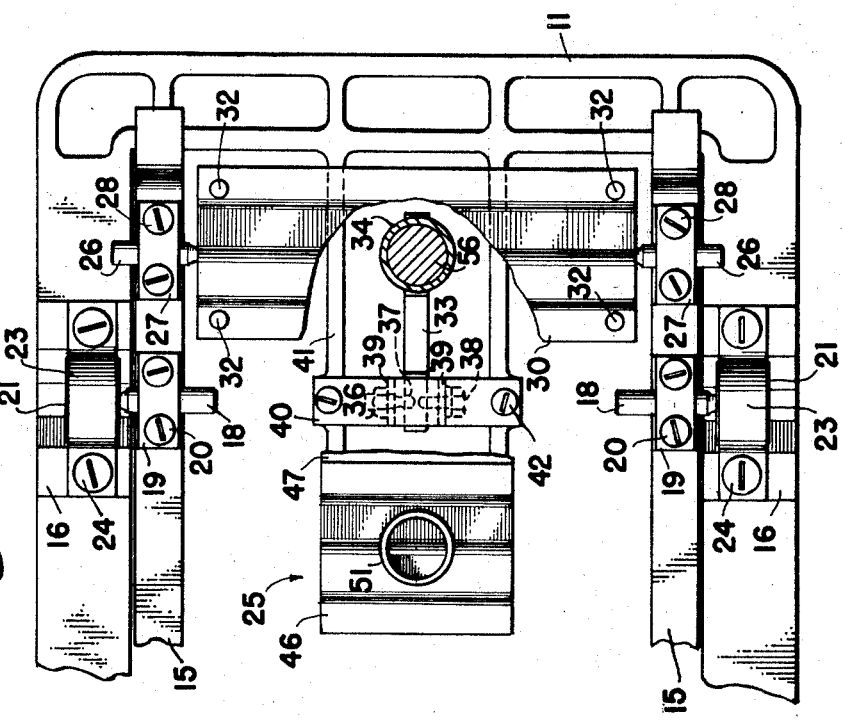
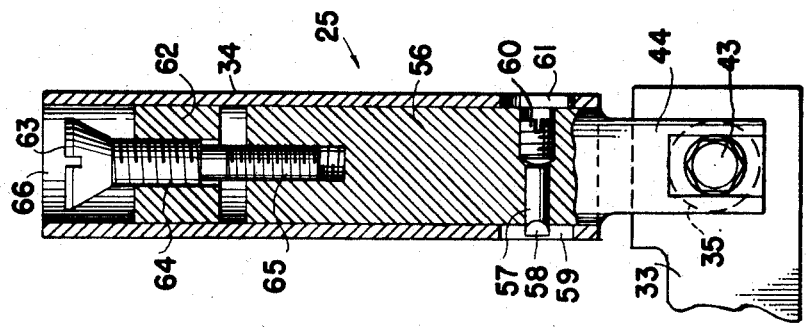

3,185,236
WEIGHING SCALES
Lawrence S. Williams, Toledo, Ohio, assignor to Toledo Scale Corporation, Toledo, Ohio, a corporation of Ohio
Filed Mar. 11, 1963, Ser. No. 264,235
2 Claims. (Cl. 177—255)

This invention relates to weighing scales and more particularly to improved load spiders for such scales.

The objects of this invention are to improve weighing scales, to facilitate the mechanical adjustment of such scales, to increase the precision of such scales, to simplify the construction of such scales, to facilitate changing the capacity of such scales, to provide light but rigid load spiders for such scales, to improve weighing scale spiders, and to provide novel means for readily adjusting the vertical dimensions of the parallelogram structures of the kind ordinarily found in weighing scales of the retail type.

One embodiment of this invention enabling the realization of these objects is a fan weighing scale provided with a load spider of tube and V channel construction. The spider is pivotally mounted on the scale's weighing lever and includes a cantilever member, which supports a post in the form of a tube that carries the scale's load receiving platter, and a second tube which is connected to the scale's check link. The check link is connected to a slidable plug within the second tube, the plug being adjustable to vary the length of one of the vertical legs of the parallelogram structure ordinarily found in weighing scales.

In accordance with the above, one feature of this invention resides in the tube and V channel construction of the load spider which is light but rigid.

Another feature resides in the cantilever design of the load spider which permits the post which carries the platter to be positioned either toward the front or back of the scale to facilitate changing the scale's capacity.

Still another feature resides in novel adjusting means including the slidable plug within the second tube for readily adjusting the length of one of the vertical legs of the parallelogram structure. The adjusting means facilitates the mechanical adjustment of the scale and increases the precision of the scale.

The above and other objects and features of this invention will be appreciated more fully from the following detailed description when read with reference to the accompanying drawings wherein:

FIG. 1 is a side elevational view of a fan weighing scale with its base housing broken away to reveal mechanism in the interior;

FIG. 2 is an enlarged perspective view of the load spider shown in FIG. 1 together with certain connected parts which are broken away;

FIG. 3 is an enlarged, fragmentary, plan view of the right hand portion of the weighing scale shown in FIG. 1 with the load platter and base housing removed to reveal mechanism in the interior; and FIG. 4 is an enlarged, vertical, sectional view taken generally along the line 4—4 of FIG. 2.

Referring to the drawings, a fan weighing scale 10 includes a base 11 enclosed by a base housing 12 which supports a chart housing 13 extending upwardly therefrom. Mechanisms within the housings 12 and 13 are shown and described in U.S. application Serial No. 246,026 filed December 20, 1962 in the name of L. S. Williams. The scale 10 functions like any ordinary fan scale, i.e., the weight of an article placed upon a platter 14 and also the value of such article, computed in accordance with such weight and the price per unit weight of such article, are indicated by the scale's indicator on the scale's chart.

The force of gravity acting on a load placed upon the platter 14 is transmitted to a lever 15 fulcrumed on the base 11. The lever and its load counterbalancing spring are disclosed in the above U.S. application Serial No. 246,026. A lever similar to the lever 15 is shown and described in detail in U.S. Patent No. 2,895,726 entitled "Ball Bearing Scale Pivots" and issued to L. S. Williams on July 21, 1959. The lever 15 is pivotally mounted on a pair of posts 16 attached by means of screws 17 to the base 11, there being a post 16 at each side of the base 11. The pivotal connections for connecting the lever 15 to the tops of the posts 16 each includes a stud 18 clamped by a cover plate 19 in a groove milled in the upper side of the lever, the cover plate 19 being attached to the lever 15 by means of a pair of screws 20. The studs 18 extend laterally and outwardly either side of the side portions of the lever 15 into ball bearing assemblies 21 that are clamped in grooves 22 atop the posts 16, the ball bearing assemblies each being clamped in its groove by means of a strap 23 fitting over the assembly and held in place by screws 24.

The platter 14 is supported by a spider 25 that is pivotally mounted on the lever 15 by two pivotal connections each of which includes a stud 26 clamped by a cover plate 27 in a groove milled in the upper side of the lever, the cover plate 27 being attached to the lever 15 by means of a pair of screws 28. The studs 26 extend laterally and inwardly either side of the side portions of the lever 15 into ball bearing assemblies 29 that are clamped one at each end of a V channel 30 of the spider 25, the ball bearing assemblies 29 each being clamped in place by means of a strap 31 fitting over the assembly and held in place by screws 32.

The spider 25 is held in an upright position by a ball bearing check link 33 having one end pivotally connected to a post 34 of the spider 25 and having its other end pivotally connected to the base 11. The ball bearing check link 33 is shown and described in detail in U.S. Patent No. 2,634,966 issued April 14, 1953 in the name of L. S. Williams; it is formed from a flat strip of material having a bore 35 (FIG. 4) at each end in which bores a plurality of bearing balls are fitted and retained as shown in the patent. The pivotal connection of the check link 33 to the base 11 includes a screw 36 (FIG. 3) having a shank 37 which forms the inner race for the bearing balls and a second screw 38 as shown in the patent. The screws 36 and 38 are threaded through downwardly extending legs 39 of a plate 40 which is attached to the top of a central part 41 of the base 11 by means of screws 42. The pivotal connection of the check link 33 to the post 34 of the spider 25 is like the above-described pivotal connection of the check link 33 to the base 11, such pivotal connection of the check link 33 to the spider post 34 including a screw 43 which corresponds to the screw 38 of the other pivotal connection and which is threaded through one of a pair of legs 44 of a bifurcated lower end of the spider post 34. The legs 44 of the bifurcated post 34 correspond to the legs 39 of the plate 40, i.e., each set of legs functions to support a ball bearing pivot.

The spider 25 is of tube and V channel construction and includes a first channel 45 opening upwardly and extending longitudinally in the scale, the channel 30 which opens downwardly and extends laterally and that is welded to the first channel, and a third channel 46 which also opens downwardly and extends laterally and that is welded to the first channel. The channel 30 is located at one end of the first channel 45 and the channel 46 is located at the other end of the first channel 45, there being a flat plate 47 located between the channels 30 and 46 and welded to the first channel 45 for the purpose of making the spider 25 more rigid. Each of the channels 30, 45 and 46 is provided with foot-like flanges 48 to obtain good connecting areas and when connected together form a T-shaped structure as seen in plan. The spider 25 also includes the post 34 which extends through the channels 30 and 45 and is welded to such channels at 49 and 50, respectively, and a post 51 which extends through the channels 45 and 46 and is welded to such channels at 52 and 53, respectively. The posts 34 and 51 are in the form of tubes, post 51 carrying the platter 14 which has a sleeve 54 sleeved over the post 51 and post 34 connected to the check link 33 as described above. The bottom of the sleeve 54 is formed to fit over the channel 46 as shown in FIG. 1 to prevent rotation of the platter 14 about the axis of the post 51, a set screw 55 keeping the platter from being lifted from the post 51.

The tube and channel construction of the spider 25 has superior simplicity and is light yet rigid. In addition, another feature resides in the cantilever design, i.e., the spider 25 is pivotally connected to the lever 15 at the ball bearings 29 and the channel 45 extends therefrom in the form of a cantilever. The cantilever member or channel 45 supports the platter 14 at its end remote from the ball bearings 29. The cantilever design of the load spider 25 permits the post 51 which carries the platter 14 to be positioned either toward the front or back of the scale to facilitate changing the scale's capacity. Varying a weighing scale's capacity by varying the location of the pivotal support of a platter on a lever is disclosed in U.S. Patent No. 1,758,036 issued May 13, 1930 to N. A. Hallwood. Accordingly, the location of the pivotal connection between the spider 25 and the lever 15 can be shifted to the left as viewed in FIG. 3 to change the scale's capacity. This is done in the factory in order to build several capacity models from similar sets of parts. Shifting of the spider 25 to the left as viewed in FIG. 1 would cause the platter 14 to engage the chart housing 13. However, by reversing the cantilever spider 25 so that the post 51 is positioned toward the front of the scale the pivotal connection between the spider 25 and the lever 15 can be shifted to the left as viewed in FIG. 1 and the platter 14 still will be in an operable position. Accordingly, the cantilever design of the load spider 25 permits identical spiders to fit several scale models to thereby reduce the number of parts needed to be manufactured and stocked.

In order that there is accurate weighing of load in any position it may occupy on the platter 14, the scale is provided with the usual parallelogram structure, such parallelogram as viewed in FIG. 1 having a first side extending from the axis of stud 18 to the axis of stud 26, a second side extending from the axis of stud 26 to the axis of screw 38, a third side extending from the axis of screw 38 to the axis of screw 43, and a fourth side extending from the axis of screw 43 to the axis of stud 18. It is vital for accurate weighing that this parallelogram be accurately constructed. The first parallelogram side, i.e., the side between the axes of studs 18 and 26, is of an accurate predetermined length because the studs are located in accurately located milled grooves in the lever 15 and its opposite side, i.e., the side between the axes of screws 38 and 43, also is of an accurate predetermined length because the bores 35 which contain the bearing balls are accurately located in the check link 33. Accordingly, by matching the lengths of the vertical sides of the parallelogram such parallelogram can be accurately constructed. This is accomplished by adjusting the length of the parallelogram leg extending between the axes of stud 26 and screw 38 until it matches the length of the other vertical parallelogram leg.

One of the features of the invention resides in novel adjusting means for readily adjusting the length of one of the vertical legs of the parallelogram structure. The adjusting means facilitates the mechanical adjustment of the scale and increases the precision of the scale; it is checked by placing a test weight in several positions on the platter 14 and seeing whether or not the weight always is indicated to weigh the same.

The bufurcated lower end of the spider post 34 to which the check link 33 is pivotally connected is a part of a slidable plug 56 located for the most part within the tube-like body portion of the post 34. A key 57, having a wedge-shaped end 58 projecting into a slot 59 in the tube-like body, is slidable in a hole in the slidable plug 56. A lock screw 60 in the slidable plug 56 forces the wedge-shaped key end 58 into the slot 59 to lock the slidable plug 56 against movement relative to the tube. Access to the kerf of the screw 60 is made through a hole 61 in the tube. When the lock screw 60 is loosened slightly, the slidable plug 56 is free to slide up and down, however, the slidable plug 56 still is prevented from turning about its axis by the engagement of the key end 58 in the slot 59. When the lock screw 60 is tightened, it holds the slidable plug 56 in its adjusted position.

A second plug 62, which is knurled and then press fitted into the upper end of the tube and, hence, fixed in place, has an adjustment screw 63 threaded through it. The adjustment screw 63 is threaded into the upper end of the slidable plug 56. This forms a push-pull connection and is used to slide the slidable plug 56 up or down in the tube. As shown in FIG. 4, screw threads 64 which engage the upper plug 62 are coarse relative to the screw threads 65 which engage the slidable plug 56. The amount of plug movement depends on the difference between such threads. Hence, a relatively large turn of the adjustment screw 63 produces only a small plug movement producing a fine, precise adjustment. The kerf of the adjustment screw 63 is reached through an opening 66 in the upper end of the tube. The dimension of the right hand vertical leg of the parallelogram structure shown in FIG. 1, i.e., the leg extending between the axes of stud 26 and screw 38, is varied by turning the adjustment screw 63 to push the slidable plug 56 out of the tube or to pull the slidable plug 56 into the tube.

In operation to make the spider adjustment, the base housing 12 and the platter 14 are removed, the lock screw 60 is loosened, and the adjustment screw 63 is turned until by trial and error a test weight placed upon the platter 14 (platter set back on post 51 for each test) in several locations is indicated to weigh the same in each location.

It is to be understood that the above description is illustrative of this invention and that various modifications thereof can be utilized without departing from its spirit and scope.

Having described the invention, I claim:

1. A weighing scale comprising, in combination, a pivotally mounted lever, a load platter, a load spider connecting the lever to the platter, check link means for holding the spider in an upright position, the load spider having a hollow leg pivotally connected to the check link means, and spider adjustment means within the leg for varying the length of the leg, the spider adjustment means including a slidable plug, a non-slidable plug and an adjustment screw threaded through the non-slidable plug and into the slidable plug, whereby turning the screw pushes the slidable plug out of the leg or pulls the slidable plug into the leg.

2. A weighing scale according to claim 1 wherein the non-slidable plug defines relatively coarse threads that mate with similar threads on the adjustment screw and the slidable plug defines relatively fine threads that mate with similar threads on the adjustment screw, whereby a relatively large turn of the adjustment screw produces only a relatively small plug movement.

References Cited by the Examiner

UNITED STATES PATENTS

| 1,668,029 | 5/28 | Strachan | 177—255 |
| 1,838,182 | 12/31 | Jacobs et al. | 177—255 |
| 2,634,966 | 4/53 | Williams | 177—255 |

FOREIGN PATENTS 469,426  11/50  Canada.

LEO SMILOW, *Primary Examiner.*